(12) United States Patent
Disser

(10) Patent No.: US 6,444,986 B1
(45) Date of Patent: Sep. 3, 2002

(54) METHOD AND APPARATUS FOR DETECTING AN OBJECT WITHIN A HEATING SOURCES'S RADIATING BEAM

(76) Inventor: James R. Disser, 10 Summer Walk Cir., Oak Ridge, NJ (US) 07438

( * ) Notice: Subject to any disclaimer, the term of this patent is extended or adjusted under 35 U.S.C. 154(b) by 0 days.

(21) Appl. No.: 09/560,731

(22) Filed: Apr. 28, 2000

Related U.S. Application Data

(60) Provisional application No. 60/131,947, filed on Apr. 30, 1999.

(51) Int. Cl.[7] .................................................. G01J 1/00
(52) U.S. Cl. .................. 250/354.1; 250/349; 250/338.1; 378/4
(58) Field of Search ............................... 250/354.1, 349, 250/338.1; 378/4

(56) References Cited

U.S. PATENT DOCUMENTS

| | | | | |
|---|---|---|---|---|
| 4,309,609 A | * | 1/1982 | Sampson | 250/354.1 |
| 5,047,639 A | * | 9/1991 | Wong | 250/354.1 |
| 5,319,202 A | * | 6/1994 | Pompei | 250/349 |
| 5,529,630 A | * | 6/1996 | Imahashi et al. | 250/354.1 |

* cited by examiner

Primary Examiner—Constantine Hannaher
Assistant Examiner—Andrew Israel
(74) Attorney, Agent, or Firm—Moser, Patterson & Sheridan, LLP; Kin-Wah Tong, Esq.

(57) ABSTRACT

A method and apparatus for detecting for detecting an object within a radiating beam of a radiating source. The method receives reflected and radiated radiation directly from the object to provide a radiation signal. The method then processes the radiation signal to provide a control to the radiating source. A concomitant apparatus comprising a detector and a control circuit is provided. The detector receives reflected and radiated radiation directly from the object and provides a radiation signal indicative of the reflected and radiated radiation received from the object. The control circuit, coupled to the detector, processes the provided radiation signal to provide a control signal to the radiating source.

21 Claims, 3 Drawing Sheets

METHOD AND APPARATUS FOR DETECTING AN OBJECT WITHIN A HEATING SOURCES'S RADIATING BEAM

This application claims the benefit of U.S. Provisional Application No. 60/131,947 filed on Apr. 30, 1999, which is herein incorporated by reference.

The invention relates to a method and apparatus for detecting an object that is within a heating source's radiating field, i.e., within the radiating beam of the heating source. More particularly, the invention relates to a method and apparatus for detecting an object in close proximity to a radiant heater, thereby causing the radiant heater to be turned off and an alarm signal to be generated.

BACKGROUND OF THE DISCLOSURE

Radiant heating appliances typically employ heating elements that consist of quartz tubes surrounding a metal heating element. Electric current is passed through the heating element that increases in temperature and in turn heats the surrounding quartz tube to incandescent temperatures. The heating elements are supported by a structure that serves several purposes. The structure protects the heating elements from coming in contact with objects with a grill. The structure also supports a reflector that is positioned behind, above, and below the elements in order to redirect the thermal radiation from the heating elements outward. Control electronics provide a means to limit the temperature of the elements and to shut the elements down in the event an excessive temperature is sensed.

Radiant energy is the primary source of heating power produced by the appliance. The high temperature of the elements and an unobstructed path from the elements or reflector to the surrounding area allow the appliance to heat objects in its beam. The appliance is typically employed in a home or office to supplement the primary heating system in the building. Unfortunately, there are numerous materials found in these environments that are flammable and present a danger of combustion. Curtains, bed sheets, and paper are typical examples of such materials. There is a possibility that these materials could accidentally come in close proximity to the heating appliance while the unit is powered and radiating. If the materials are close enough to the radiant elements they will be heated by the radiation to a temperature in excess of their combustion temperature and will ignite. The usual safety measures employed in the design of the heating appliance reduce the possibility of ignition. A grill serves to obstruct a material that would otherwise come in contact with the elements. The grill becomes more effective as the ratio of open area to grill work is reduced. The grill cannot be made 100 percent effective however since that would either severely limit or prevent the radiation from escaping from the heater. Therefore the grill is only partially effective as a safety device for the prevention of fire.

Thermal limit or safety switches can be deployed to sense the temperature within the heater and to shut off the flow of power to the elements when an excessive temperature is detected. These devices are typically a bimetal snap acting contact that activates when the body of the switch has reached a limiting threshold temperature. The device has a large thermal mass and requires tens of seconds to reach the threshold temperature where it activates. The switch will not activate in normal operation when radiated energy is escaping the heater. When a sufficient amount of the radiant energy is prevented from escaping the temperature of the switch increases and the heater may eventually be shut down by the switch. This would not occur if either the radiant energy is only partially blocked or insufficient time is allowed for the switch to heat. Unfortunately, it is possible for a small strip of combustible material to come in close proximity with the heater such that the material is heated to its combustion temperature without sufficient radiation being blocked to heat the safety switch. It is also possible for a material with a low combustion temperature to come in close proximity and to heat to its combustion temperature quickly before the thermal safety switch has time to reach its threshold temperature and shut off the radiant power. In both of these cases the thermal safety switch is unable to prevent the combustion of material. The thermal safety switch is only partially effective in preventing accidental combustion.

There are several other inventions that contain devices that sense materials in proximity to the heater. These employ different sensing technologies to detect when materials are dangerously close. Motion detectors have been applied that detect thermal variations from objects moving in their field of view. A motion sensing device is not able to detect a slow moving or stationary target and may not be completely effective at sensing materials that are close enough to combust but remain stationary.

Another technology utilizes a projected beam from an LED and an infrared sensor to detect when the projected light from the LED is reflected from a material in close proximity. This is effective only when the material is present within the projected beam from the LED. An array of LEDS is employed to enlarge the protected area. The array is costly and increases complexity of the heater control system. It is difficult to project light from the LED array in such a way that the entire area illuminated by the heating elements is completely protected as a result of the restrictions imposed on the placement of the emitters and detectors by the heating elements and supporting structures. Materials that are located outside of the area protected by the array but within the radiated energy from the heater can reach combustion temperatures without being sensed. This technology is not completely effective at preventing accidental combustion.

Thus, there is a need in the art for an inexpensive, and more effective technology that can quickly sense when materials are located in close proximity to radiant heaters within their projected beam and shut the power to the heater elements in order to prevent accidental combustion.

SUMMARY OF THE INVENTION

The present invention is a method and apparatus for sensing the proximity to a heating source, e.g., a radiant heater, of a foreign material within the heaters beam and shut off the power to the radiant elements to prevent accidental combustion. The invention improves the speed of response and the sensitivity anywhere within the radiant heater beam for detection of objects, including small objects.

To sense when an object is nearby the invention incorporates a thermopile infrared radiation detector. The heaters radiant elements project a beam of infrared radiation during operation. When an object comes in close proximity to the heater, radiation is reflected and absorbed by the object. The thermopile detector is made to be sensitive to the predominant wavelengths of the reflected radiation. The portion of the radiation absorbed by the object causes the object to heat. As the object heats the amount of thermal radiation it emits increases. The thermopile sensor is also made to be sensitive to these emitted wavelengths. Thus the detector is able to receive both reflected and emitted radiation from the object.

The detector is prevented from receiving radiation directly from the radiant heater elements by shielding. The shielding serves both to block direct radiation or radiation reflected from the heater components from being received and to function as an aperture to define the field of view of the detector. The shielding can also serve as a concentrator to collect more energy from the target and focus it onto the detector in order to increase the signal received from foreign materials. The shielding is arranged to reduce the likelihood that direct sunlight could reach the detector.

An electronic control circuit is incorporated that amplifies, filters, and digitizes the signal from the thermopile detector. The temperature of the detector affects the thermopile detector response. A temperature sensor is included within the detector to measure the detector temperature and compensate the detector response. The control circuitry includes amplifiers, filters and analog to digital converters to process the signal from the temperature sensor. The digitized signal information is processed by a microcontroller incorporated in the circuit. The controller executes a method that utilizes the temperature and radiation measurements and decides when an excess of radiation has been detected and if so activates a switching device to stop the flow of electrical power to the radiant heater elements.

An indicator alerts people in the vicinity of the heater that the detector circuit has been activated and that a potentially dangerous situation exists and requires attention. Since the radiant heating elements provide the source of the power that is detected, the alarm signal will disappear when the power to the radiant elements is removed. This requires a period of time as the heater elements cool slowly.

Once the elements are cooled and the alarm signal has disappeared the sensing circuit will not detect the object. To prevent the heater from cycling back on, the present control method holds the heater in the off state. An external input device is included to provide a means to signal the processor that the object has been removed and the heating power can be reapplied. Additionally a method can attempt to generate heating power after a period of time without detecting an object for a predetermined number of trials in order to provide an automatic recovery. In fact, the microcontroller can be programmed with any number of different control methods which utilize the input and output devices described to effect the control of the heater element power.

The method of sensing utilized in the invention has several advantages over the prior art. Since the method employs the radiant power of the heater itself, any object placed within its beam will naturally be illuminated. The detector and shielding is arranged so that radiation can reach the sensor from any location within the beam. This combination provides near 100 percent coverage of the area where there is a danger of accidental combustion. In addition, the sensor is capable of detecting both the reflected and radiated energy from a foreign object placed in close proximity within the heater beam. Radiated energy is produced in increasing amounts as the temperature of the foreign object increases. The sensor reacts very quickly to this increased radiation and can shut the heater off before the object reaches dangerous temperatures close to the combustion point. The sensor therefore can detect a dangerous situation by sensing the dangerous condition of high temperature directly and is more effective than other methods that can only detect the proximity of either a moving or stationary object. The sensing system is simplified by utilizing the radiant heating elements themselves as the source of energy, thereby eliminating the need for any additional sources and their associated cost. The very high power of the heating elements is used to advantage to produce strong signals that are easily distinguished from noise and interference. High signal strength allows the system to readily detect small objects.

The invention therefore describes an effective, and inexpensive method and apparatus that quickly detects small foreign objects located anywhere within the heating beam in close proximity to a radiant heating appliance and shuts power off to the heating elements before the object reaches dangerous temperatures.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
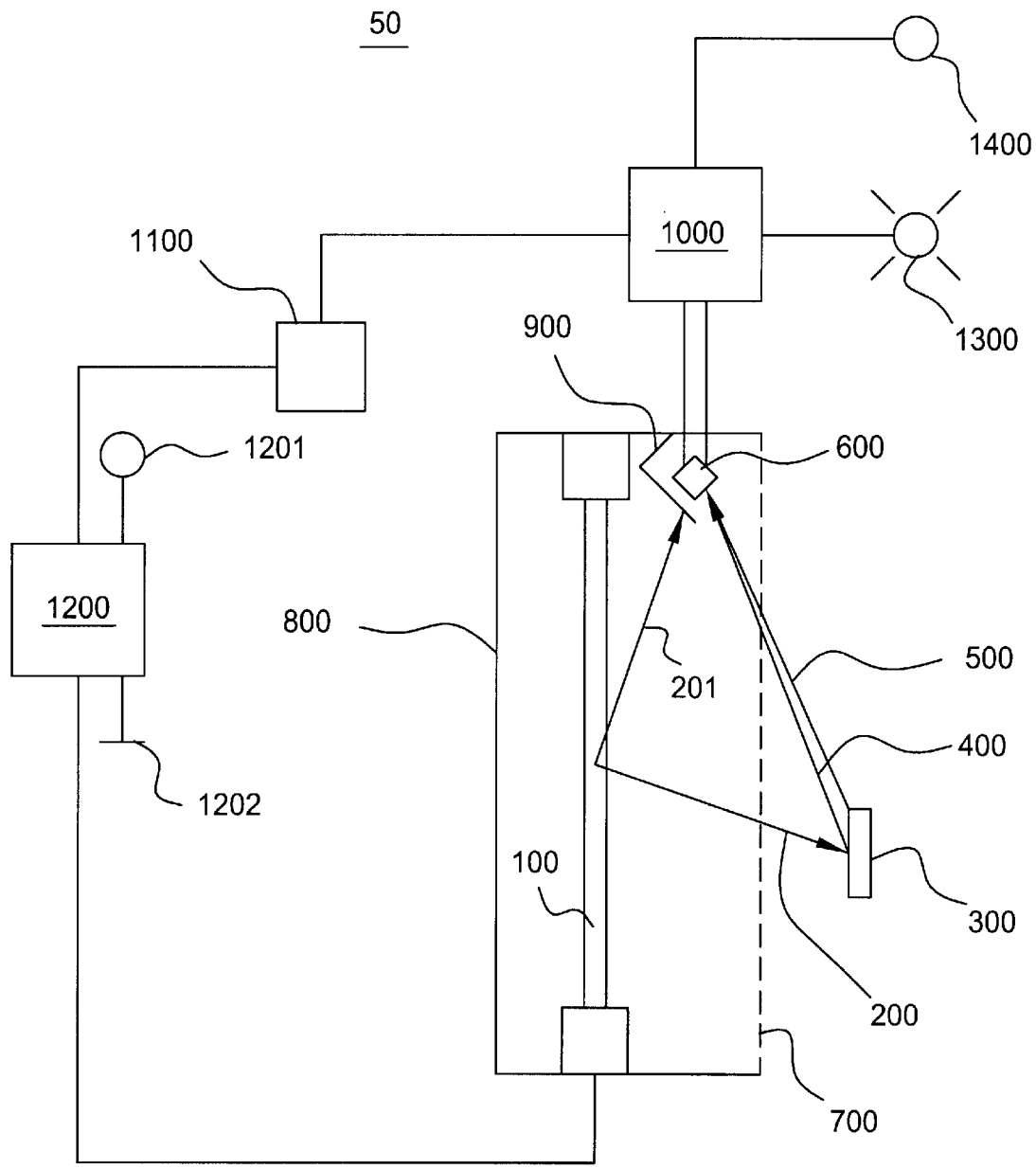
FIG. 1 depicts a block diagram of the apparatus of the present invention.

FIG. 1 depicts a block diagram of the preferred embodiment of the invention. Specifically, the preferred embodiment is a radiant heating appliance 50 or heater comprising at least one radiant heating element 100, a detector or sensor 600, a protective grill 700, a reflector 800, a shield 900, a control circuit 1000, a switching device 1100 (e.g., a relay, a triac or an SCR), a power circuit 1200, an indicator 1300 and an input device 1400.

The radiant heating element 100 (or heating element) is coupled to and powered by the power circuit 1200. During operation of the appliance 50, the power circuit 1200 supplies current through a resistive heating element contained within the radiant heating element 100. Upon receipt of this current, the resistive heating element 100 raises a surrounding quartz envelope to incandescent temperatures. The quartz envelope produces copious amounts of radiation or energy, typically in the form of infrared radiation or visible light, in all directions.

The radiant heating element 100 is partially surrounded by reflective material. This reflective material, e.g., reflector 800, redirects the radiation as shown by path 200 to the front of the appliance 50 defined by the protective grill 700, thereby forming a wide "radiation or radiation beam" and increasing the efficiency of the appliance 50 or heater. The protective grill 700 prevents foreign object(s) 300 from contacting the heating element 100, as temperatures on the surface of the heating element 100 are dangerously high.

During operation of the heater 50, a foreign object 30 may come in close proximity to the grill 700. In this case, the object 300 receives radiation along path 200 from the heating element 100. The object 300 also diffusely reflects a portion, as shown by path 400, of the received radiation 200 with the remaining portions of the received radiation 200 being either transmitted or absorbed. Since very few common substances are transparent in the infrared bands utilized in this invention, the object 300 would most likely absorb the remaining radiation. Upon absorption of this remaining radiation, the surface of the object 300 heats up. As the surface temperature of the object 300 increases, the object 300 will emit increasing amounts of infrared radiant energy as shown by path 500.

The reflected 400 and radiated 500 infrared energy or radiation is received by a sensor or detector 600 such as a thermopile type radiation sensor. In the preferred embodiment, the sensor 600 is EG&G Heimann part #TPS434, but other sensors 600 with a different sensitivity may be substituted depending on the wavelength bands of interest and/or compensation signals provided. The sensor 600 is further described in FIG. 2.

The shield 900 protects the sensor 600 from receiving stray radiation 201 received either directly from the heating element 100 or from an internal reflection within the heater 50. The shield 900 further serves to limit the field of view of the sensor to an area illuminated by the radiant heat element 100. In this manner, the shield 900 protects the sensor from direct sunlight and other forms of radiated interference.

The control circuit 1000 is coupled to the sensor 600 to receive a signal (referred to as a radiation signal) therefrom. In operation, the control circuit 1000 evaluates the signal from the sensor 600 to determine whether the reflected 400 and radiated 500 infrared energy exceeds a predefined threshold, e.g., the threshold can be based on combustion points of objects that will likely be encountered in a particular application of the heater 50. If the energy exceeds the predefined threshold, then the control circuit 1000 activates the relay 1100. In this case, the relay 1100 acts as an open switch to cut off the power from the power source 1200 to the heating element 100, thereby shutting off the heater element 100. As such, the heater element 100 quickly cools off before the object reaches a dangerous temperature corresponding to its combustion point. The control circuit 1000 is further described in FIG. 3.

The power circuit 1200 transfers power from a DC supply to the heating element 100. The power circuit 1200 is coupled to the DC supply at respective positive and negative terminals 1201 and 1202. The power circuit 1200 includes wiring and safety devices such as fuses and thermal limit switches for connection of the heater to power mains. The power circuit 1200 also includes an AC to DC conversion circuit capable of supplying sufficient DC voltage and current for the operation of control circuit 1000.

The indicator 1300 signals a person nearby that the control circuit 1000 has activated the relay 1100, thereby cutting power to the heater element 100. In the preferred embodiment, the indicator 1300 is an LED lamp, but could be substituted with any number of indicators of a variety of types. For example, the indicator 1300 may alternatively or additionally comprise an audible buzzer. In fact, the heater 50 may include any number of indicators 1300 to indicate the status or provide feedback for the control and operation of the heater 50.

The external input device 1400 provides allows a person to control the heater 50. If an object is detected and the power to the heater 50 elements is removed, the control circuit 1000 can be programmed to hold the heater 50 in this state until a signal is detected from the input device 1400. In this case, the control circuit 1000 resets the control therein and restores power to the heater element 100 by deactivating the relay 1100. Additional input devices 1400 may provide additional controls such as switches for controlling or turning the heater 50 on and off, setting the heater power level, or shutting off the heater 50 if not in an upright position. In fact, the heater 50 may include a number of input devices 1400 of different types that, when combined with a suitable selection of a microcontroller circuit within the control circuit 1000, may be used to control the functions of the heater 50.

Figure 2:
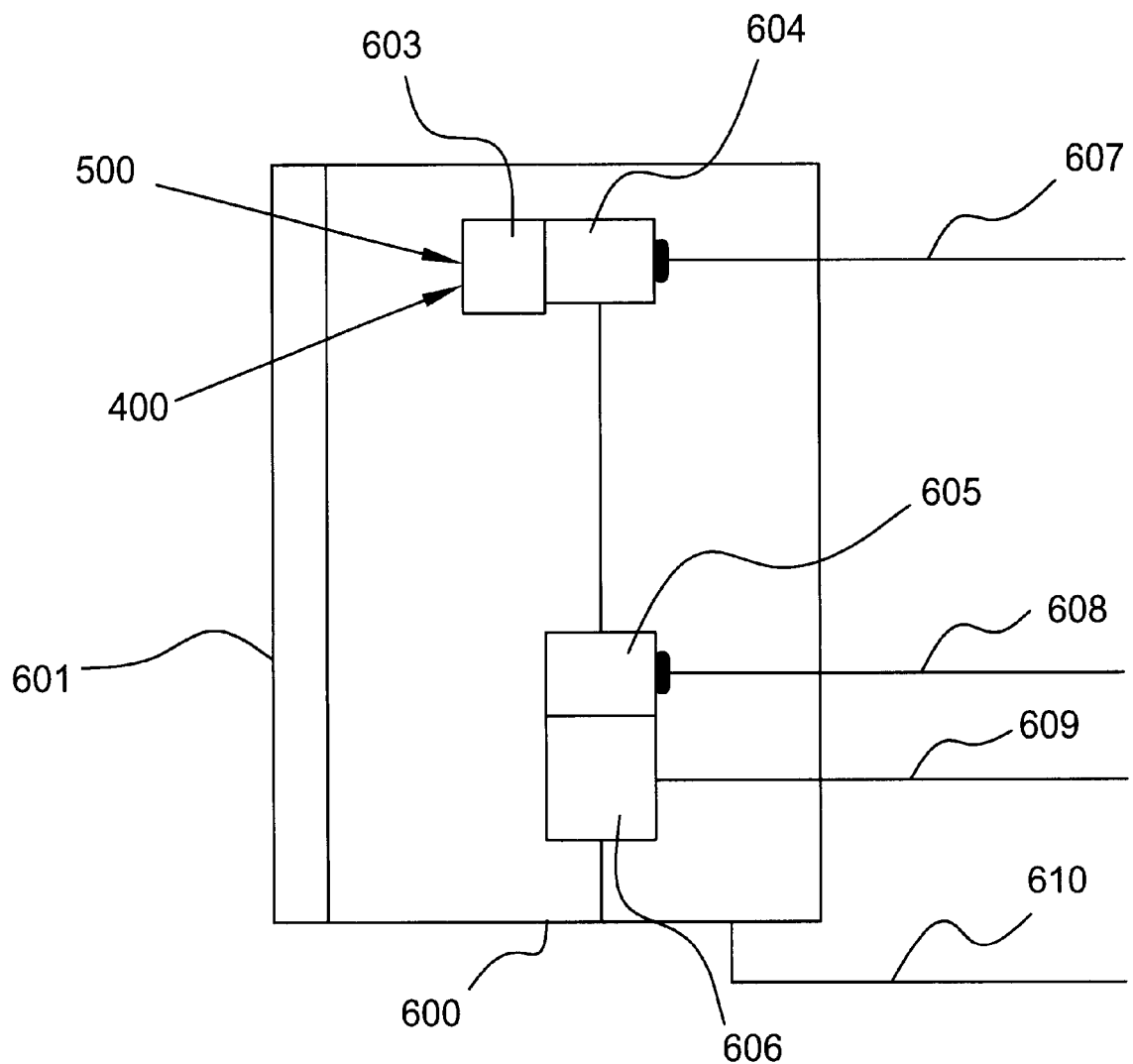
FIG. 2 illustrates a thermopile detector used in the present invention.

FIG. 2 illustrates a block diagram of the thermopile detector or sensor 600 having a hot junction area 604 and a cold junction area 605. The detector 600 comprises a filter material 601, and an absorbing material 603 deposited on the hot junction 604 area. The filter material 601 rejects radiation outside a band of interest, i.e., from about 5.5 microns to about 20 microns. The absorbing material 603 then absorbs the radiation passing through the filter material 601. The sensor 600 is configured or constructed to minimize the heating of the cold junction area 605.

The radiation passing through the filter 603 produces a temperature difference between the hot and cold junctions 604 and 605. The thermopile detector 600 then converts this temperature difference into a potential difference between external contacts 607 and 608 for respective hot and cold junctions 604 and 605.

The sensor 600 includes an internal temperature reference 606 as provided by a thermistor inside the sensor housing. The sensor 600 provides a resistance between terminal 609 and housing 610, that measures the temperature of the cold junction 605, thereby allowing compensation of the signal voltage produced by the temperature difference between the hot 604 and the cold 605 junctions. Thus, a temperature reference signal is derived from terminal 609 and the case housing 610 by connection to a source of power and a linearization network as described below. The sensor 600 is capable of providing a temperature reference signal and a voltage difference signal to the control circuit 1000.

The sensor 600 produces a signal (referred to as a radiation signal) that is a function of the reflected 400 and radiated 500 energy received from the object and the temperature of the cold junction 605. Note that the shield 900 protects the sensor 600 from stray radiation 201 received either directly or from an internal reflection within the heater. By using the shield 900 to exclude stray and external radiation 201, the sensor 600 produces a signal that is a measure of the proximity and temperature of an object located within the beam of the heater.

Figure 3:
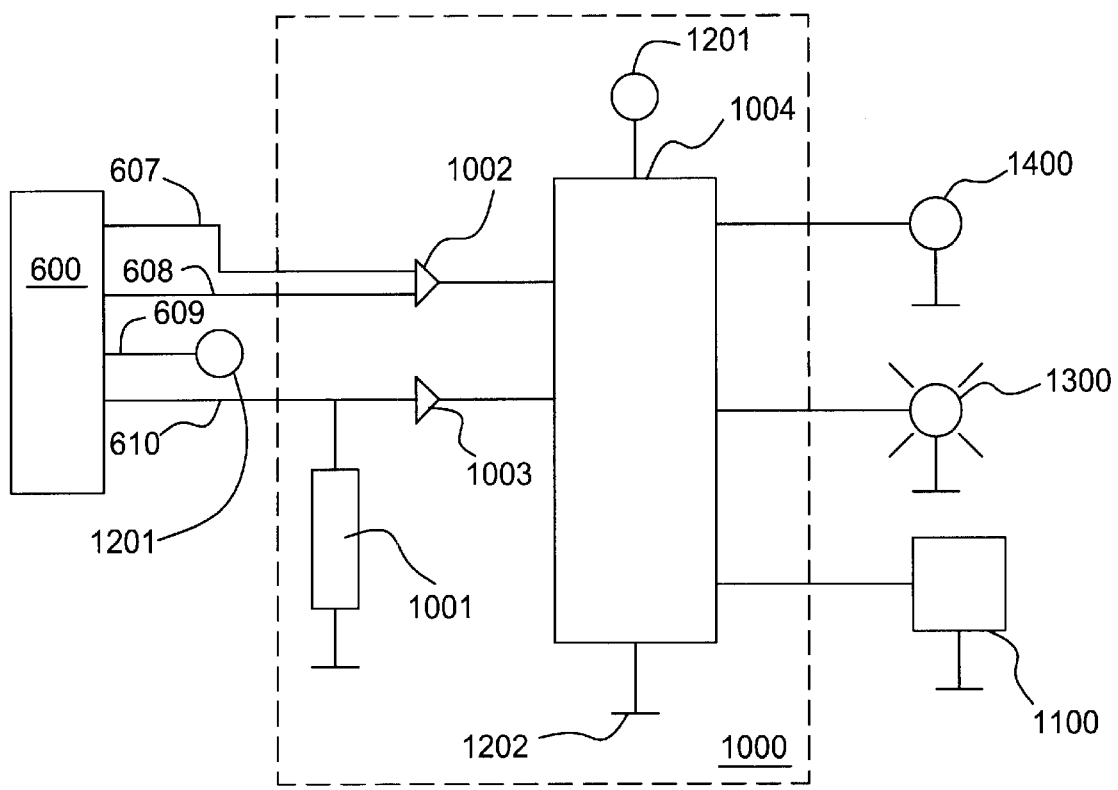
FIG. 3 depicts a block diagram of a control circuit used in the present invention.

FIG. 3 depicts a block diagram of a control circuit 1000 used in the invention. Specifically, the control circuit 1000 comprises a linearization network 1001, amplifier circuits 1002 and 1003, and a microcontroller 1004. The signals from the sensor 600 are coupled to the control circuit 1000 at amplifier circuits 1002 and 1003. The temperature reference signal produced by terminals 609 and 610 is also coupled to the control circuit at the linearization network 1001. The linearization network 1001 serves to calibrate and scale the temperature reference signal. The amplifier circuits 1002 and 1003 amplify, filter and scale the signals produced by the sensor 600 for input into microcontroller 1004.

In the preferred embodiment, the controller, e.g., microcontroller, 1004 is Microchip Technologies part#PIC12C671-04/p. The microcontroller 1004 comprises an integrated clock, 4 channel Analog to Digital converter, RAM, ROM, CPU, peripheral driver, and watchdog circuitry. A programmed software, previously loaded into the microcontroller ROM, provides the instructions for the function of the heater control. The microcontroller 1004 then executes a series of instructions in accordance with the programmed software.

The microcontroller 1004 digitizes the signals from amplifiers 1002 and 1003, processes the digitized values, and compares the processed values to a calibrated and programmed threshold value. The threshold value is programmed at the time of manufacture by measuring the sensor response to an object 300 of a specified size located at a specified distance from the heater grill 700. If the processed signal exceeds the programmed threshold, then the microcontroller 1004 activates relay 1100, thereby cutting off power to the heating element 100 and preventing further heating of the object 300.

The temperature signal 609 is an indication of the operating temperature of the heater. The control method can utilize this temperature signal 609 to control the power to the heater element 100, by cutting the power if the temperature exceeds a preset limit or threshold. If power is interrupted to the heater element 100, microcontroller 1004 will activate indicator 1300 to indicate that power has been interrupted to the heater element 100. In turn, a user can reset the unit 50 by providing inputs to the microcontroller 1004 via input device 1400.

It should be noted that various functions and features described above can be implemented using hardware or software (or a combination of both in the form of application specific integrated circuit (ASIC)). As such, various methods and functions described above can be stored on a computer readable medium, e.g., recalling a routine from a storage and operated by the controller in a memory location such as RAM.

Although various embodiments which incorporate the teachings of the present invention have been shown and described in detail herein, those skilled in the art can readily devise many other varied embodiments that still incorporate these teachings.

What is claimed is:

1. An apparatus for detecting an object disposed within a radiating beam of a radiating source, said apparatus comprising:
   a detector for receiving reflected and radiated radiation directly from the object and for providing a radiation signal indicative of said received reflected and radiated radiation from the object; and
   a control circuit, coupled to said detector, for processing said provided radiation signal to provide a control signal to said radiating source.

2. The apparatus of claim 1, further comprising a shield proximately disposed about said detector, where said shield prevents said detector from receiving radiation directly from said radiating source.

3. The apparatus of claim 1, wherein said radiation emitted from said radiating source comprises infrared radiation.

4. The apparatus of claim 1, wherein said control signal is configured to disable said radiating source if said radiation signal reaches a threshold level.

5. The apparatus of claim 4, wherein said threshold level is based upon a combustion point of the object.

6. The apparatus of claim 1, wherein said detector comprises a thermopile.

7. The apparatus of claim 6, wherein said thermopile receives radiation having a wavelength within a band of about 5.5. microns to about 20 microns.

8. The apparatus of claim 7, wherein said thermopile comprises a hot junction, a cold junction, and absorbing material disposed on said hot junction, where said absorbing material absorbs the received radiation.

9. The apparatus of claim 8, wherein said thermopile measures a temperature difference produced by the absorbed radiation, and converts the temperature difference into a voltage difference signal.

10. The apparatus of claim 1, wherein said provided radiation signal comprises a temperature reference signal and a voltage difference signal.

11. The apparatus of claim 10, wherein said control circuit comprises:
    a linearization network for calibrating said temperature reference signal from said detector;
    an amplifier circuit for amplifying said voltage difference and temperature reference signals from said detector; and
    a controller, coupled to said linearization network and said amplifier circuit, for processing the calibrated and amplified signals to provide said control signal.

12. The apparatus of claim 11, wherein said control signal causes said radiating source to disable the emitting of said radiating beam.

13. The apparatus of claim 12, further comprising a switching device, coupled to said control circuit, for disabling said radiating source upon receipt of said control signal.

14. The apparatus of claim 12, further comprising an input device, coupled to said control circuit, for enabling said radiating source upon receipt of said control signal.

15. The apparatus of claim 11, further comprising an indicator, coupled to said control circuit, for providing an alert indication upon receipt of said control signal.

16. A method for detecting an object within a radiating beam of a radiating source, said method comprising the steps of:
    receiving reflected and radiated radiation directly from the object to provide a radiation signal; and
    processing said provided radiation signal to provide a control signal to said radiating source.

17. The method of claim 16, wherein said control signal is configured to disable said radiating source if said radiation signal reaches a threshold level.

18. The method of claim 17, further comprising the step of:
    enabling said previously disabled radiating source upon receiving an external signal from an input device, where said enabled radiating source radiates said radiating beam.

19. The method of claim 16, wherein said receiving step comprises the step of:
    shielding the direct receipt of radiation from said radiating source.

20. The method of claim 16, wherein said receiving step comprises the step of:
    using a thermopile to provide said radiation signal.

21. A computer-readable medium having stored thereon a plurality of instructions, the plurality of instructions which, when executed by a processor, cause the processor to perform the steps of:
    receiving reflected and radiated radiation directly from an object within a radiating beam to provide a radiation signal, where said radiating beam is provided from a radiating source; and
    processing said provided radiation signal to provide a control signal to said radiating source.

* * * * *